United States Patent
Hissong et al.

(10) Patent No.: US 9,718,339 B2
(45) Date of Patent: Aug. 1, 2017

(54) MOLDED COVER

(71) Applicant: COMMERCIAL SEWING, INC., Torrington, CT (US)

(72) Inventors: Michael E. Hissong, Torrington, CT (US); David J. Mazzarelli, Torrington, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 32 days.

(21) Appl. No.: 14/724,903

(22) Filed: May 29, 2015

(65) Prior Publication Data

US 2015/0343889 A1    Dec. 3, 2015

Related U.S. Application Data

(60) Provisional application No. 62/005,479, filed on May 30, 2014.

(51) Int. Cl.
*B60J 11/08*      (2006.01)
*B60J 11/04*      (2006.01)

(52) U.S. Cl.
CPC ................. *B60J 11/04* (2013.01)

(58) Field of Classification Search
CPC ........................................... B60J 11/08
USPC .................. 114/218, 361; 150/168, 154; 296/136.07, 136.08; 359/511
See application file for complete search history.

(56) References Cited

U.S. PATENT DOCUMENTS

| | | | |
|---|---|---|---|
| D29,696 S | 11/1898 | Casey et al. | |
| D49,217 S | 6/1916 | King | |
| D109,358 S | 4/1938 | Ridenour | |
| D115,805 S | 7/1939 | Wright | |
| 3,339,607 A * | 9/1967 | Howard | B63B 35/7946 114/79 R |
| 3,491,388 A * | 1/1970 | Bareis | B63B 17/02 114/361 |
| 3,818,620 A * | 6/1974 | Field | D05C 1/04 38/102.2 |
| 5,636,871 A * | 6/1997 | Field | B63B 25/002 114/361 |
| D397,551 S | 9/1998 | Shefler | |
| D407,556 S | 4/1999 | Au | |
| D417,541 S | 12/1999 | Conway | |
| 6,012,757 A * | 1/2000 | Viertel | B60J 3/0282 296/97.2 |
| 6,095,068 A * | 8/2000 | Hori | D05C 9/04 112/103 |
| D430,393 S | 9/2000 | Conway | |

(Continued)

OTHER PUBLICATIONS

Requirement for Restriction/Election; Design U.S. Appl. No. 29/492,428, filed May 30, 2014; Date of Mailing Apr. 5, 2016; 6 Pages.

*Primary Examiner* — Sue A Weaver
(74) *Attorney, Agent, or Firm* — Cantor Colburn LLP

(57) ABSTRACT

A molded pocket of a cover for a transportation vehicle is provided including a body having a complementary upper portion and lower portion configured to define a cavity. A feature of the transportation vehicle is received within the cavity. The lower portion of the body is affixed to the cover. A coupling mechanism is configured to selectively couple at least a part of the upper portion and the lower portion of the body to transform the body between an open position and a closed position.

18 Claims, 16 Drawing Sheets

(56) References Cited

U.S. PATENT DOCUMENTS

| | | |
|---|---|---|
| D451,674 S | 12/2001 | Leins |
| 6,325,121 B1 * | 12/2001 | Hudnall .................. B60J 11/06 |
| | | 150/166 |
| D459,887 S | 7/2002 | Johnson |
| 6,588,827 B2 * | 7/2003 | Heiland .................. B60J 11/00 |
| | | 150/166 |
| D495,185 S | 8/2004 | Palmer |
| D514,861 S | 2/2006 | Mundy et al. |
| D514,862 S | 2/2006 | Fair |
| D518,640 S | 4/2006 | Hoofnagle |
| 7,021,235 B1 * | 4/2006 | Nikjewicz-Larsen .. B63B 59/00 |
| | | 114/361 |
| D586,559 S | 2/2009 | Lyons et al. |
| D685,185 S | 7/2013 | Bulzis |
| D692,665 S | 11/2013 | Willows et al. |
| D703,944 S | 5/2014 | Marks |
| D703,949 S | 5/2014 | Chappell et al. |
| D712,144 S | 9/2014 | Albanese |
| D716,045 S | 10/2014 | Requa |
| D731,178 S | 6/2015 | Gorouvein et al. |
| 2005/0134078 A1 * | 6/2005 | Iwatsuka ................ B60J 3/0282 |
| | | 296/97.2 |
| 2015/0210150 A1 * | 7/2015 | Alexander ............. B63B 17/02 |
| | | 150/166 |

* cited by examiner

/ MOLDED COVER

CROSS-REFERENCE TO RELATED APPLICATION

This application claims the benefit of U.S. provisional patent application Ser. No. 62/005,479 filed May 30, 2014, the entire contents of which are incorporated herein by reference.

BACKGROUND

Exemplary embodiments of the invention relate generally to a cover for a transportation vehicle and more particularly, to a molded cover for transportation devices.

Many transportation vehicles, such as power boats for example, utilize a canvas or fabric cover to protect at least the interior of the vehicle from the elements, thereby enabling the vehicle to be stored outside. When installed, these covers commonly encase one or more functional features of the transportation vehicle, such as the gas cap or cleats for example. Although the cover is intended to protect these functional features, the cover not only limits access to such features, but may also provide inadequate protection, such as due to misalignment when the cover is installed and one of the functional features is in use.

Accordingly, there is a need for a cover of a transportation vehicle that is capable of allowing access to the functional features, while also providing adequate protection for those features.

SUMMARY

According to one embodiment, a molded pocket of a cover for a transportation vehicle is provided including a body having a complementary upper portion and lower portion configured to define a cavity. A feature of the transportation vehicle is received within the cavity. The lower portion of the body is affixed to the cover. A coupling mechanism is configured to selectively couple at least a part of the upper portion and the lower portion of the body to transform the body between an open position and a closed position.

According to another embodiment, a covering for a transportation vehicle is provided including a cover configured to connect to the transportation vehicle. The cover includes an opening through which a component of the transportation vehicle extends. A molded pocket is attached to the cover adjacent the opening. The molded pocket defines a cavity within which the component is received. The molded pocket is movable between a first position and a second position to provide access to the component.

BRIEF DESCRIPTION OF THE FIGURES

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
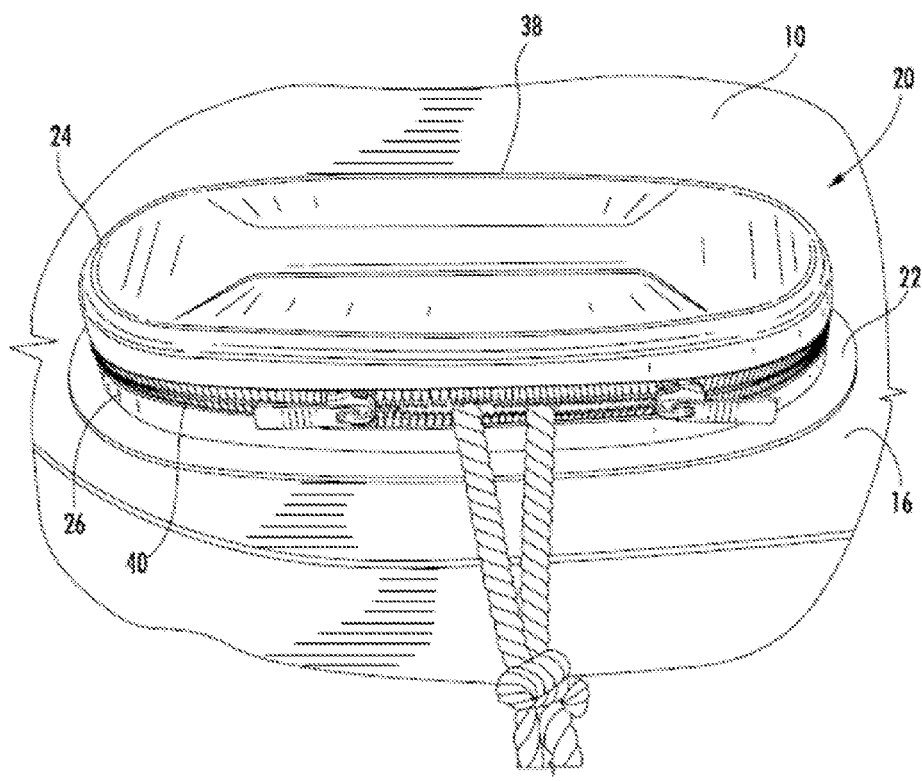
FIG. 1 is a perspective view of a generally closed molded pocket formed in a cover according to an embodiment of the invention.
Figure 1A:
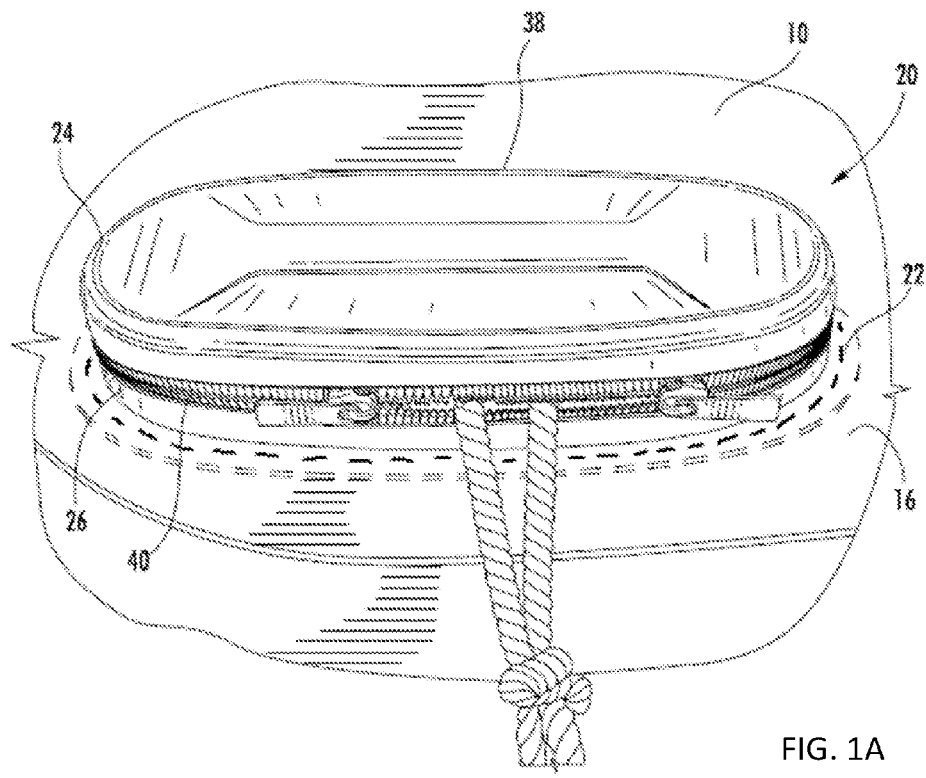
FIG. 1A is a perspective view of a generally closed molded pocket formed in a cover according to another embodiment of the invention.

The detailed description explains embodiments of the invention, together with advantages and features, by way of example with reference to the drawings.

DETAILED DESCRIPTION

The following disclosure will detail particular embodiments according to the present invention, which provides a cover for a transportation vehicle, and more particularly, to a cover having a molded pocket. Reference is now made to the drawings, wherein like reference numerals are used to refer to like elements throughout the disclosure.

Figure 2:
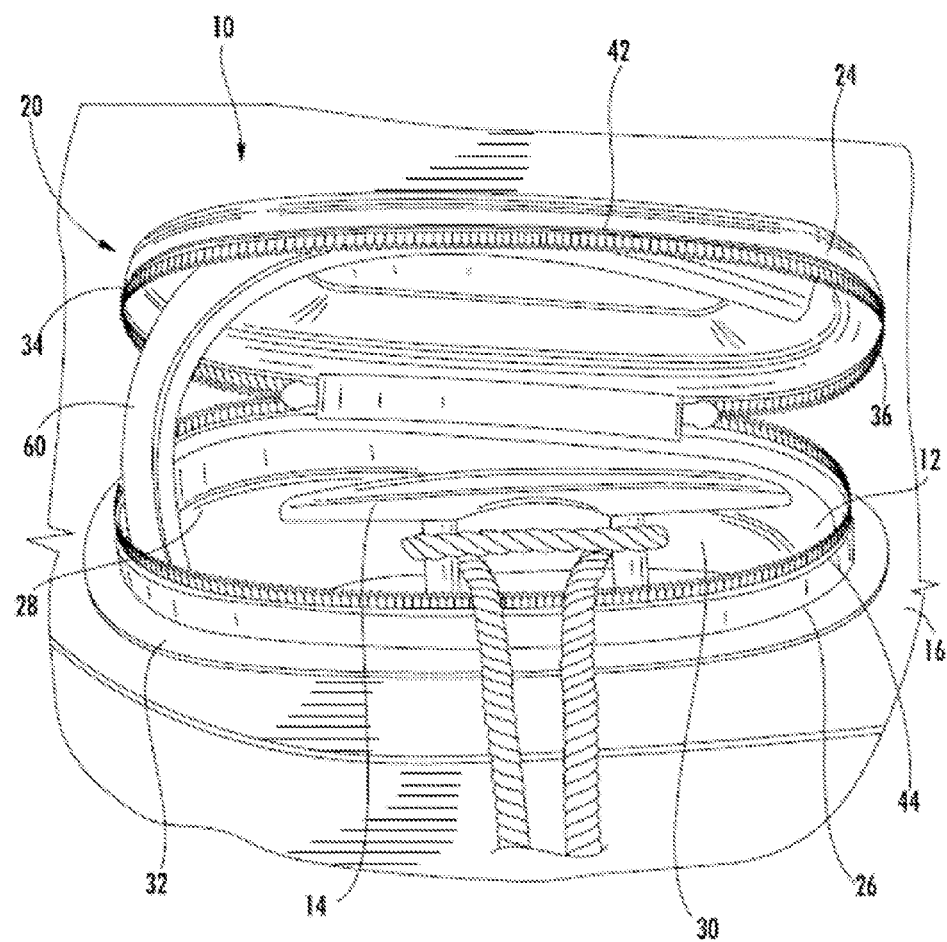
FIG. 2 is a perspective view of an open molded pocket formed in a cover according to an embodiment of the invention.
Figure 2A:
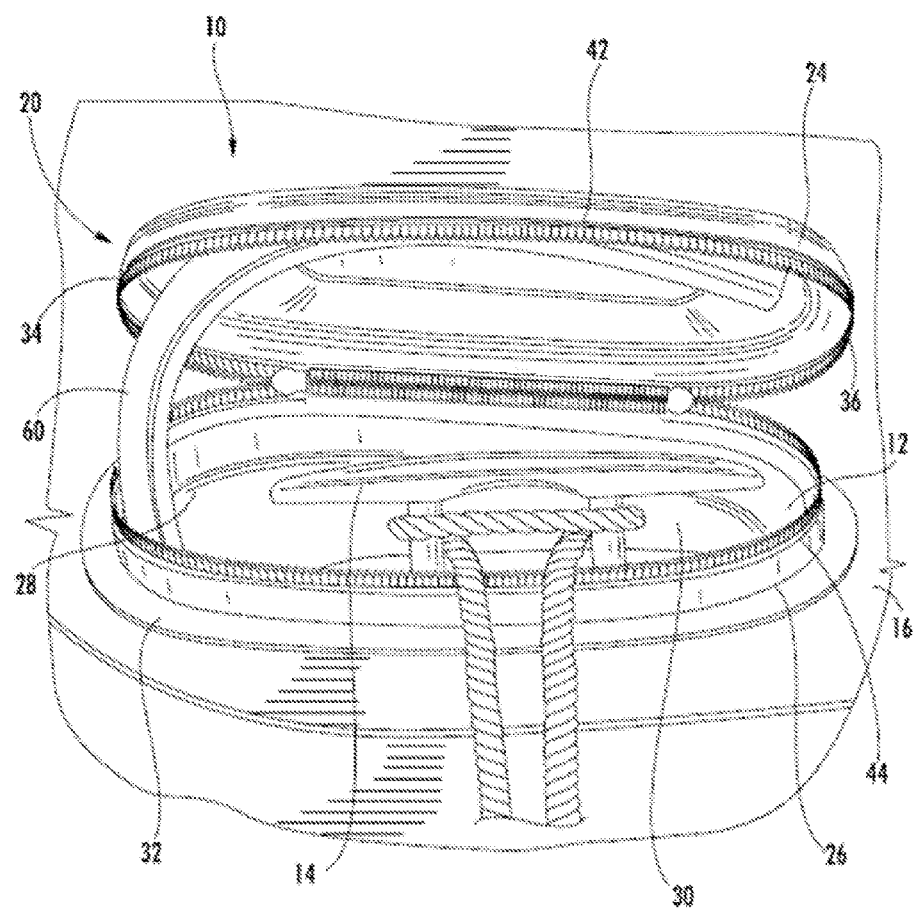
FIG. 2A is a perspective view of an open molded pocket formed in a cover according to another embodiment of the invention.
Figure 3:
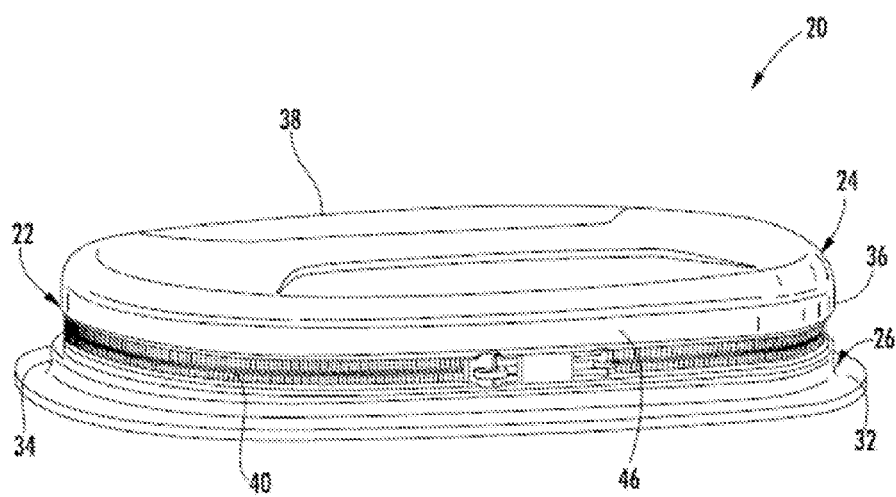
FIG. 3 is a perspective view of a molded pocket according to an embodiment of the invention.
Figure 4:
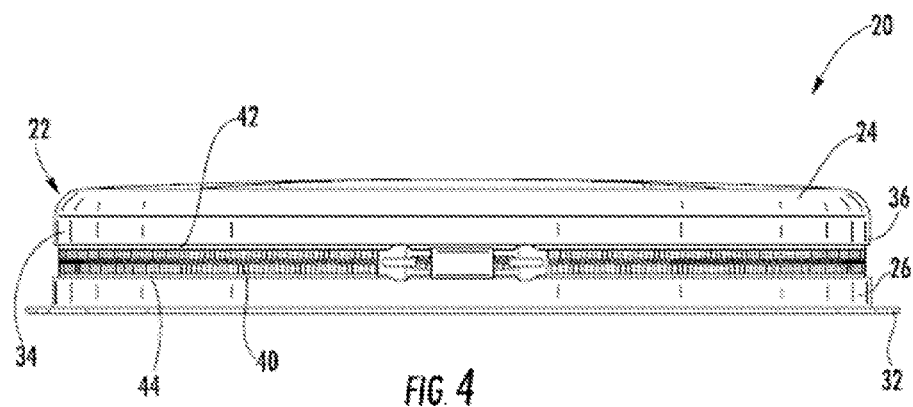
FIG. 4 is a front view of the molded pocket of FIG. 3 according to an embodiment of the invention.
Figure 5:
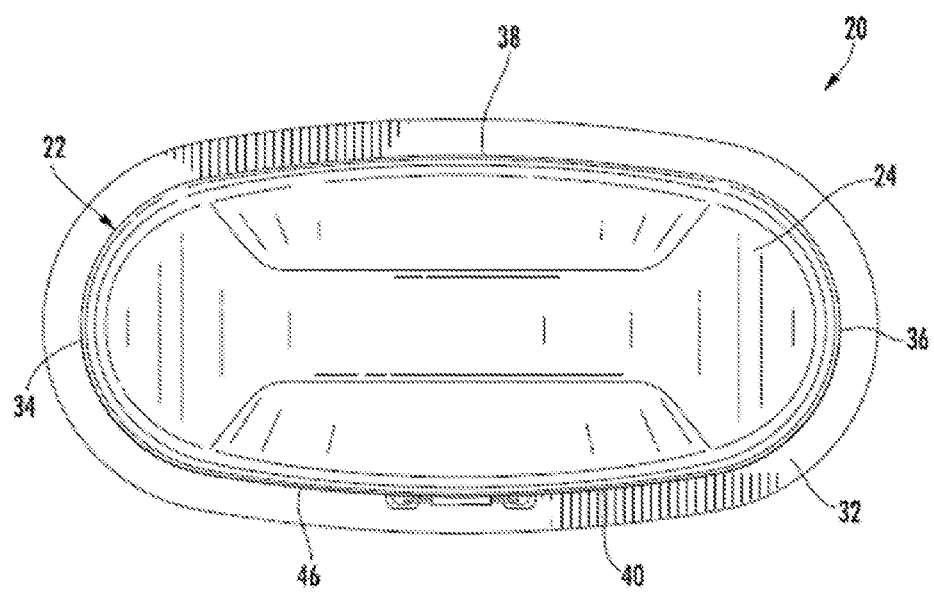
FIG. 5 is a top view of a molded pocket of FIG. 3 according to an embodiment of the invention.
Figure 6:
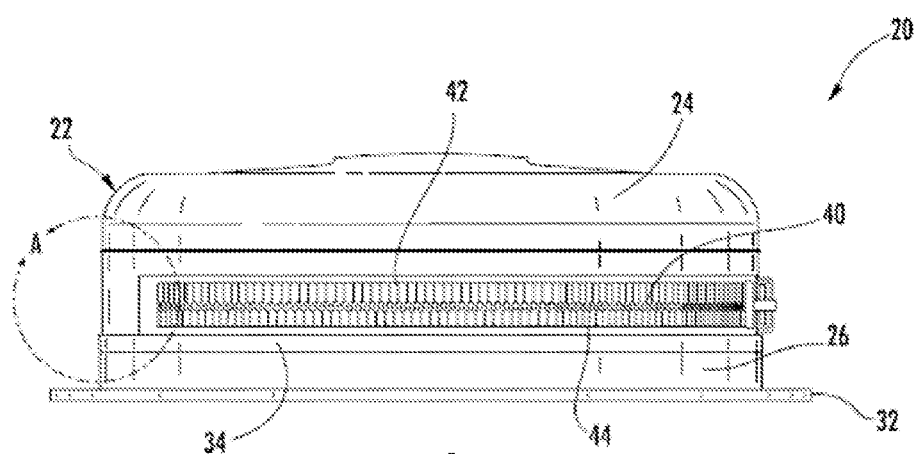
FIG. 6 is a side view of a molded pocket of FIG. 3 according to an embodiment of the invention.
Figure 6A:
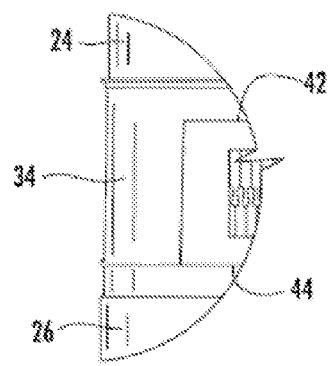
FIG. 6A is a detailed view of a portion of the side of the molded pocket of FIG. 6 according to an embodiment of the invention.
Figure 7:
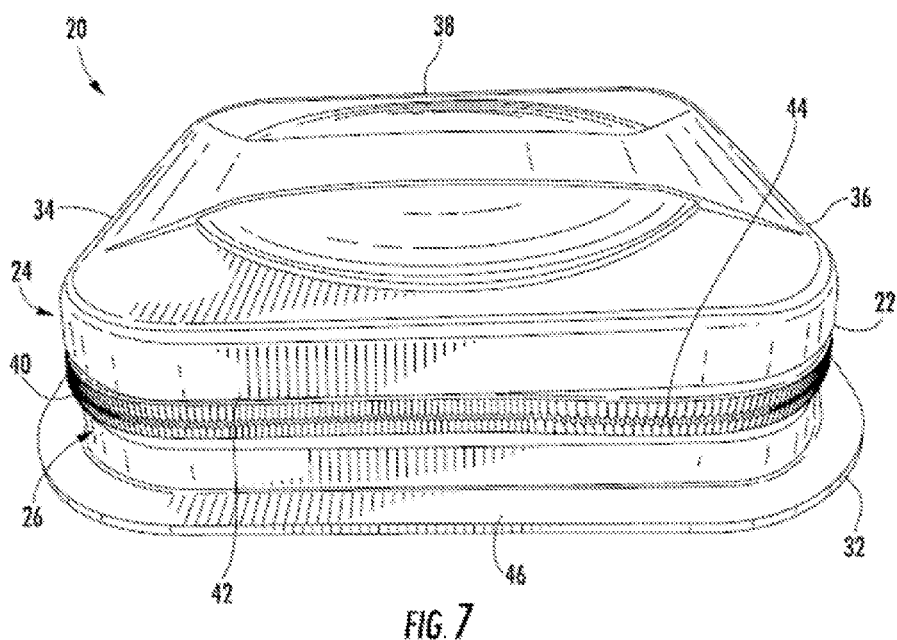
FIG. 7 is a perspective view of another molded pocket according to an embodiment of the invention.
Figure 8:
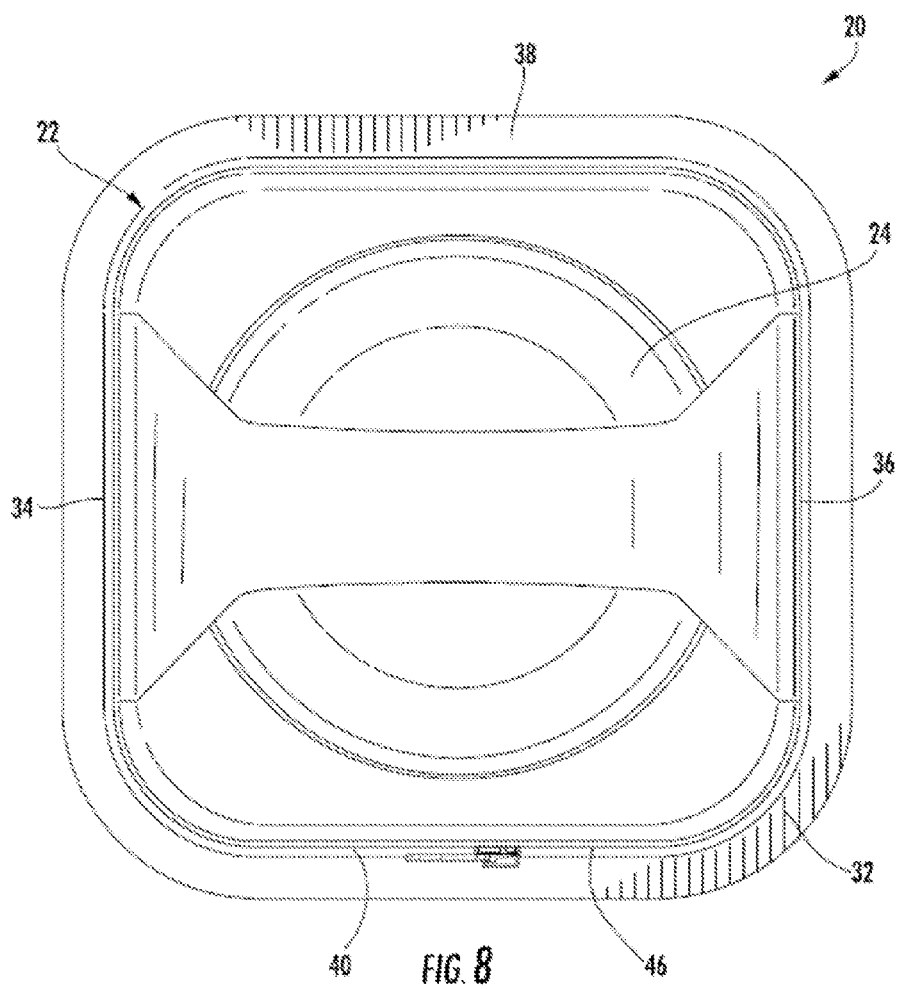
FIG. 8 is a top view of the molded pocket of FIG. 7 according to an embodiment of the invention.
Figure 8A:
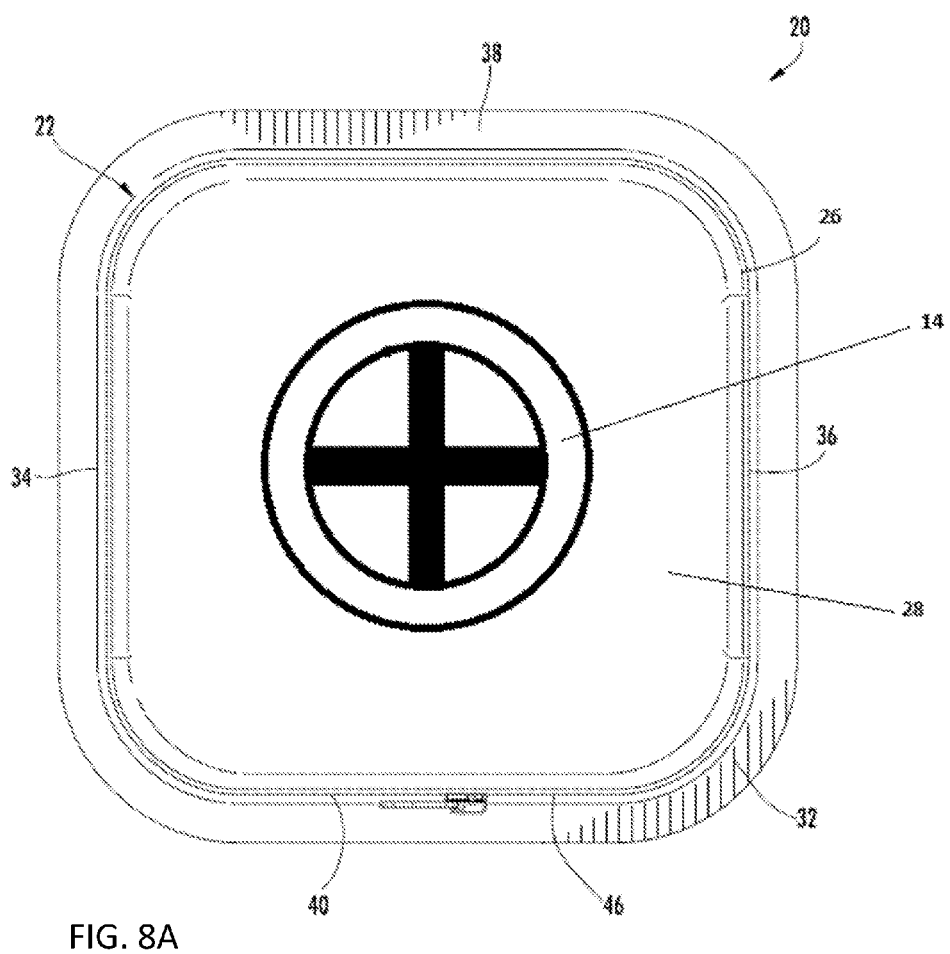
FIG. 8A is a top view of the molded pocket of FIG. 7 in an open configuration according to an embodiment of the invention.
Figure 9:
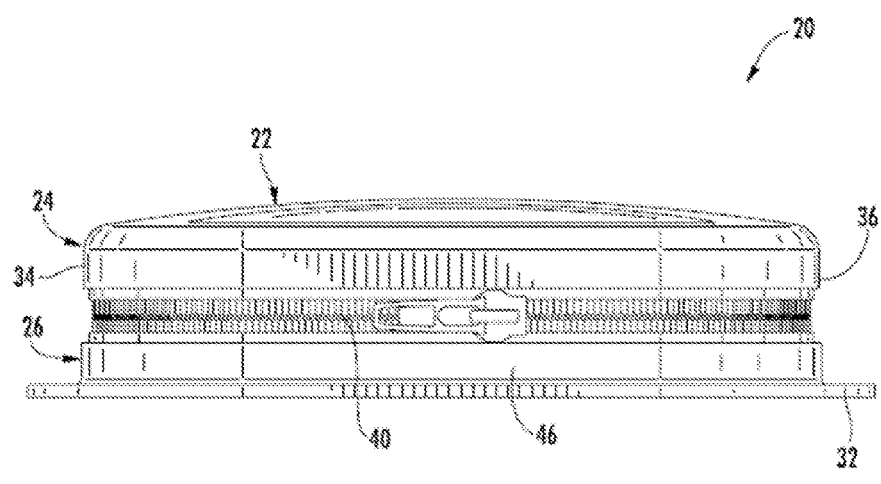
FIG. 9 is a top view of the molded pocket of FIG. 7 according to an embodiment of the invention.
Figure 10:
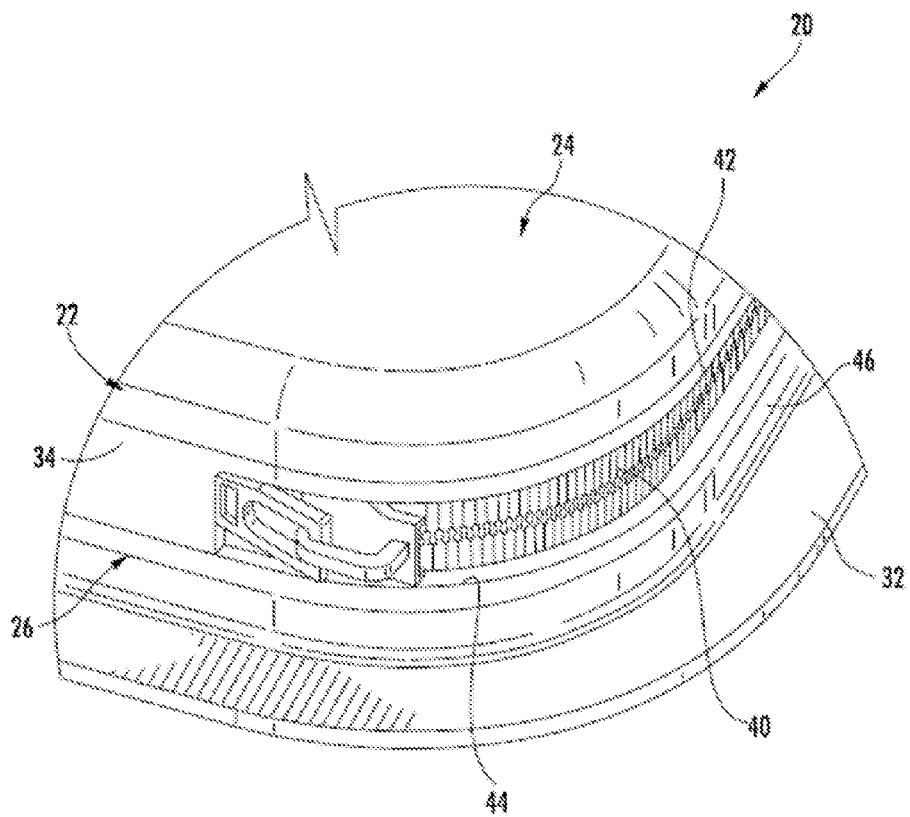
FIG. 10 is a perspective view of a corner of the molded pocket of FIG. 7 according to an embodiment of the invention.
Figure 11:
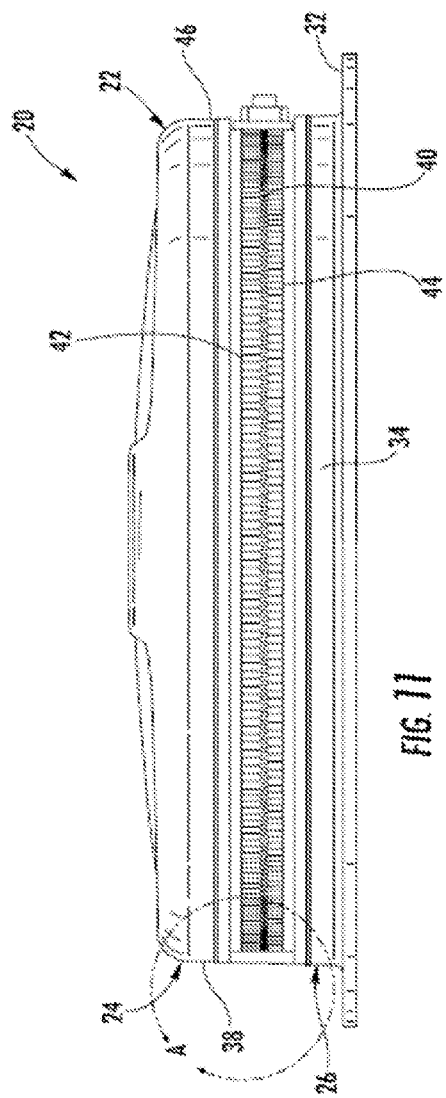
FIG. 11 is a side view of the molded pocket of FIG. 7 according to an embodiment of the invention.
Figure 11A:
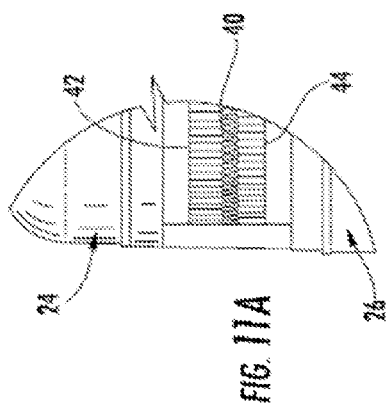
FIG. 11A is a detailed view of a portion of the side of the molded pocket of FIG. 11 according to an embodiment of the invention.
Figure 12:
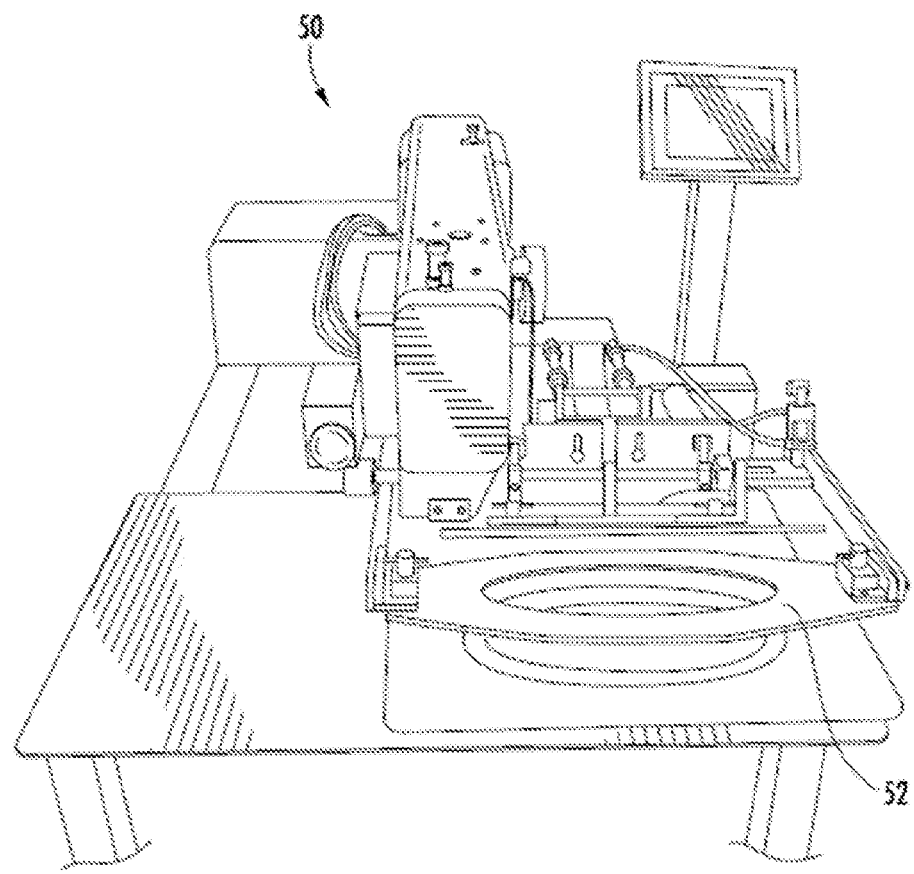
FIG. 12 is a perspective view of a machine configured to form the molded pocket according to an embodiment of the invention.

Referring now to FIGS. 1 and 2, a portion of a cover 10 configured for use with a transportation vehicle (not shown), such as a boat for example, is illustrated. The cover 10 includes at least at least one opening 12 complementary to a functional feature 14 of the transportation vehicle, such as a cleat or a gas cap for example. As a result, when the cover 10 is installed over the transportation vehicle (not shown), the functional feature 14 is positioned within or adjacent the opening 12 of the cover 10 (see FIG. 2). As illustrated in the FIGS., the at least one opening 12 is encased by a molded pocket 20. The molded pocket 20 is attached to the cover 10 and is movable between a substantially closed position (FIG. 1) and a substantially open position (FIG. 2).

Referring now to FIGS. 3-12a, examples of a molded pocket 20 are illustrated in more detail. The molded pocket 20 generally includes a body 22 having a first, upper portion 24 and a second, lower portion 26. Together the upper and lower portions 24, 26 define a cavity 28 configured to receive the feature 14 arranged within or extending through an adjacent opening 12 in the cover 10. The body 22 of the molded pocket 20 may be formed from any suitable material, including, but not limited to molded plastic, polymer, and impregnated fabric, as well as any combination thereof for example. In the illustrated, non-limiting embodiments, the upper portion 24 and the lower portion 26 generally have a molded construction such that each portion 24, 26 is configured to retain its shape during operation. In addition, the interior (not shown) of the upper portion 24 may be configured to conform to the functional feature 14 received within the cavity of the molded pocket 20.

The upper and lower portions 24, 26 of the body 22 are generally similar in shape and are generally complementary to at least one opening 12 formed in the cover 10. The lower portion 26 of the body 22 includes a through hole 30 (FIG. 2) similar or substantially identical to the at least one opening 12 in the cover 10. The lower portion 26 of the body 22 additionally includes a flange 32 configured to attach to the cover 10. The flange 32 may be affixed to either an exterior surface 16 or an interior surface (not shown) of the cover 22, such as with adhesive or sewing for example.

In the embodiment illustrated in FIGS. 1-6a, the body 22 of the molded pocket 20 has a generally elongated oval shape having a rounded first side 34 and second, opposite side 36. In such embodiments, the functional feature 14 that the molded pocket 20 is configured to receive may be a cleat. In the embodiment illustrated in FIGS. 7-11a, the body 22 of the molded pocket 20 is generally square in shape and has rounded corners. In such embodiments, the functional feature 14 that the molded pocket 20 may be configured to protect is a gas cap.

In the non-limiting embodiment illustrated in FIG. 2, a part of the upper portion 24 and the lower portion 26 of the body 22 may be integrally formed, such as along a back side 38 of the molded pocket 20 for example. In such embodiments, the integrally formed section of the upper and lower portions 24, 26 may define a hinge axis X about which the upper portion 24 can pivot relative to the lower portion 26.

The body 22 additionally includes at least one coupling mechanism 40 configured to selectively couple at least a part of the upper portion 24 of the body 22 to the lower portion 26 of the body 22 to transition the molded pocket 20 between an open position and a closed position. In one embodiment, the coupling mechanism 30 is a zipper connected to adjacent edges 42, 44 of the upper and lower portions 24, 26 of the body 22. However, other coupling mechanisms 40, such as snaps, clasps or other closures are within the scope of the invention. In instances when the upper portion 24 and the lower portion 26 include an integrally formed hinge, the coupling mechanism 40 extends about only a portion of the periphery of the body 22. For example, the illustrated zipper extends over a front side 46, as well as over only a portion of both a first side 34 and the second side 36 of the body 22. In other embodiments, the coupling mechanism 40 may be disposed about the entire periphery of the body 22 such that the upper portion 24 of the body 22 is separable from the lower portion 26 of the body 22.

When the molded pocket 20 is in an open position, the at least one coupling mechanism 40 does not couple the upper portion 24 and the lower portion 26 of the body 22. For the molded pocket 20 to be in a closed position, however, the at least one coupling mechanism 40 couples part or all of the upper portion 24 and the lower portion 26 of the body 22. As illustrated in FIG. 1, both the first side 34 and the second side 36 of the upper portion 24 and lower portion 26 are coupled via the one or more coupling mechanisms 40. Only a part of the upper portion 24 and the lower portion 26 along the front side 46 of the body 22 is coupled to provide access to the feature 14 arranged within the cavity 28 of the molded pocket 20. Such a configuration, may allow ropes, cords, or other suitable items interacting with the feature 14 to be utilized while maximizing the protection provided by the molded pocket 20. As illustrated in the embodiment illustrated in FIG. 2, arranged within the upper portion 24 of the molded pocket 20 may be a movable stopper 60. The stopper 60 may be movable between a stowed position (FIG. 1) and an extended position (FIG. 2), such as when the upper portion and the lower portion of the body 22 are uncoupled for example, to retain the molded pocket 20 in a substantially open position. When the stopper 60 is in the extended position, direct access to one or more components arranged within the molded pocket 20 is achieved.

Figure 13:
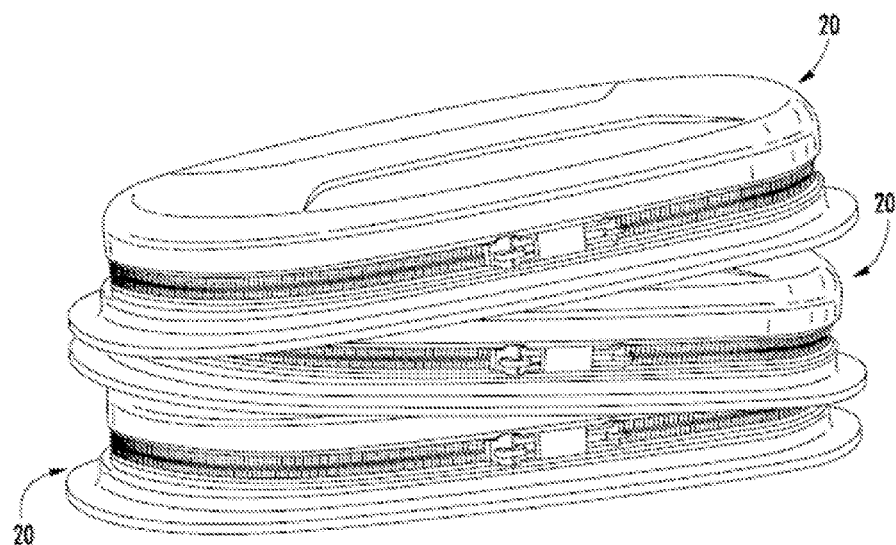
FIG. 13 is a perspective view of a plurality of molded pocket stacked according to an embodiment of the invention.

Referring now to FIG. 13, an example of a machine 50 and mold 52 configured to form the molded pocket 20 is illustrated. The mold 52 may be used to form a body 22, which is later separated into an upper portion 24 and a lower portion 26. The cavity 28 formed in each body 22, allows the molded pockets 20 to be stacked, as shown in FIG. 13, for storage purposes.

Inclusion of at least one molded pocket 20 on a cover 10 for a transportation vehicle, allows for access to a feature 14 housed within the molded pocket, while adequately protecting the feature 14 from the elements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A molded pocket of a cover for a transportation vehicle, comprising:
    a body including a complementary upper portion and lower portion configured to define a cavity within which a feature of the transportation vehicle is received, said lower portion of the body being affixed to the cover adjacent an opening such that said cavity is in communication with said opening; and
    a coupling mechanism configured to selectively couple at least a part of said upper portion and said lower portion such that said upper portion is movable relative to said lower portion between an open position and a closed position to provide access to said cavity.

2. The molded pocket of claim 1, wherein, said body of the molded pocket having a shape generally complementary to a shape of said opening formed in the cover.

3. The molded pocket of claim 1, wherein said lower portion of said body is attached to said cover with an adhesive.

4. The molded pocket of claim 1, wherein said lower portion of said body is sewn to said cover.

5. The molded pocket of claim 1, wherein said lower portion includes a flange, said flange being coupled to an exterior surface of the cover.

6. The molded pocket of claim 1, wherein said lower portion includes a flange, said flange being coupled to an interior surface of the cover.

7. The molded pocket of claim 1, wherein a part of said upper portion and said lower portion are integrally formed to define a hinge axis about which said upper portion pivots relative to said lower portion.

8. The molded pocket of claim 1, wherein said upper portion is separable from said lower portion.

9. The molded pocket of claim 1, wherein said coupling mechanism includes a zipper operably coupled to said upper portion and said lower portion of said body.

10. The molded pocket of claim 1, wherein said upper portion is configured to conform to said feature received within the cavity of said body.

11. The molded pocket of claim 1, wherein said body has a substantially elongated oval shape.

12. The molded pocket of claim 11, wherein said feature received within said cavity of the molded pocket is a cleat.

13. The molded pocket of claim 1, wherein said body has a substantially square shape.

14. The molded pocket of claim 13, wherein said feature received within said cavity of the molded pocket is a gas cap.

15. The molded pocket of claim 1, wherein a portion of said body is formed from a molded plastic material.

16. A covering for a transportation vehicle, comprising:
a cover configured to connect to the transportation vehicle, the cover including an opening through which a component of the transportation vehicle extends; and
a molded pocket attached to said cover adjacent the opening, said molded pocket including a first portion and a second portion that cooperate to define a cavity within which said component is received, said first portion being movable relative to said second portion between a first position and a second position to provide access to said component.

17. The covering according to claim 16, wherein said second portion of the body being affixed to said cover.

18. The covering according to claim 17, wherein said molded cover further comprises a coupling mechanism configured to selectively couple at least part of said first portion and said second portion such that said molded pocket is movable between said first position and said second position.

* * * * *